R. S. PEIRCE.
ANCHORAGE DEVICE.
APPLICATION FILED MAY 1, 1916. RENEWED MAR. 10, 1920.
1,356,401.
Patented Oct. 19, 1920.
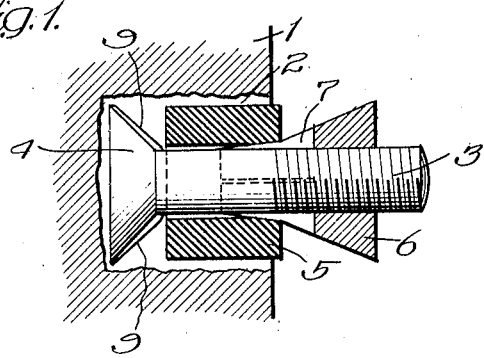
Fig. 1.
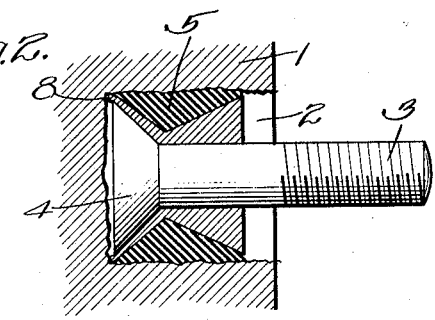
Fig. 2.
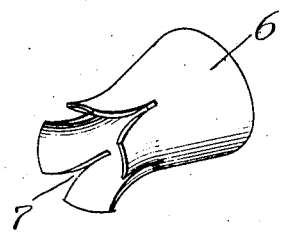
Fig. 3.
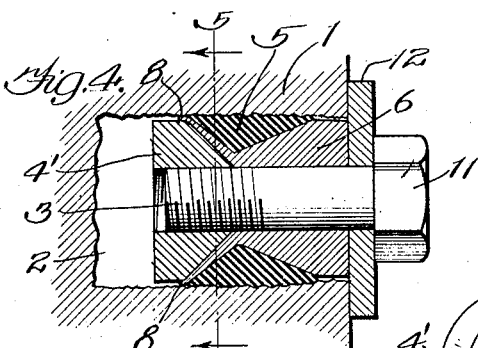
Fig. 4.
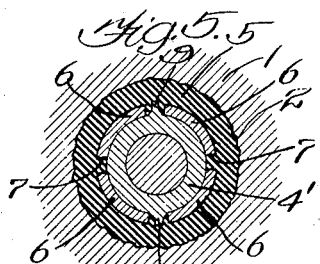
Fig. 5.
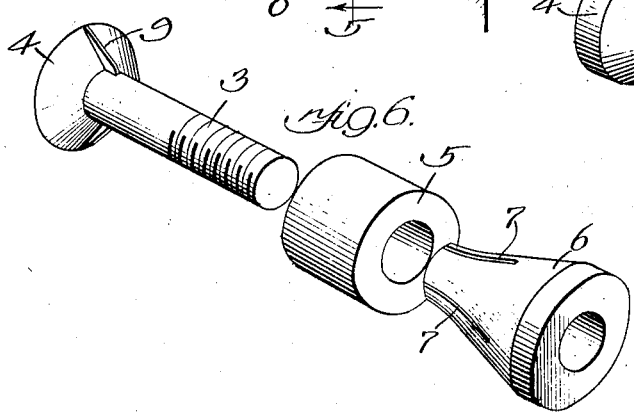
Fig. 6.
Fig. 7.
INVENTOR.
Ralph S. Peirce.
BY
ATTORNEY

UNITED STATES PATENT OFFICE.

RALPH S. PEIRCE, OF HINSDALE, ILLINOIS.

ANCHORAGE DEVICE.

1,356,401.     Specification of Letters Patent.     Patented Oct. 19, 1920.

Application filed May 1, 1916, Serial No. 94,610. Renewed March 10, 1920. Serial No. 364,756.

*To all whom it may concern:*

Be it known that I, RALPH S. PEIRCE, citizen of the United States, residing at Hinsdale, in the county of Dupage and State of Illinois, have invented a certain new and useful Improvement in Anchorage Devices, of which the following is a full, clear, concise, and exact description, reference being had to the accompanying drawings, forming a part of this specification.

My invention relates to anchorage devices employing a supporting element, such as a bolt, and an expansible element for holding the supporting element in position within a hole or recess in a wall or other mounting. One feature of my invention relates to an improved form of expansion element and a second feature of the invention resides in the combination of my improved form of expansion element with another element that is adapted to take part in effecting the expansion of the aforesaid element, this latter element being itself also desirably expansible and being preferably soft as compared with the metal of the first aforesaid expansible element but to which characteristic the invention is not to be limited.

The invention has for another of its objects the provision of a construction whereby the anchoring bolt may not be turned with respect to the expansible element or elements that hold it in place. There are other characteristics of my invention as will appear.

The device of my invention has certain advantages that will appear in the following description of two embodiments of the invention, reference being had to the accompanying drawing in which Figure 1 is a view in elevation, mainly in section, showing an anchoring bolt within a receiving hole or recess provided in a wall or other mounting and the expansible elements hitherto mentioned shown in association therewith in readiness to be expanded to anchor the bolt to the wall or mounting; Fig. 2 illustrates the parts shown in Fig. 1 with the expansible elements expanded to anchor the bolt, this section being taken on a slightly different plane, however, to bring out a feature of construction; Fig. 3 shows the expansible element of harder metal in the shape it assumes when slightly expanded; Fig. 4 is a sectional view illustrating a modification; Fig. 5 is a view on line 5 5 of Fig. 4; Fig. 6 shows the structure of Figs. 1 and 2 with the three elements thereof in separated relation; and Fig. 7 illustrates the bolt of Fig. 4, the nut with which this bolt is provided being separated from the bolt.

Like parts are indicated by similar characters of reference throughout the different figures.

The wall or other mounting 1 to which the bolt is to be anchored is provided with a bolt receiving hole or recess 2 into which the iron bolt 3 is inserted. This bolt carries an inner forwardly sloping enlargement 4 (in the form of a head for the bolt in the construction of Figs. 1, 2 and 6) that coacts with the expansible element or elements to hold the bolt in place. In the form of the invention illustrated in Figs. 4, 5 and 7 the bolt enlargement is in the form of an iron nut $4^1$ which is threaded upon the bolt shank. Where an expansible element of comparatively soft material is employed I desirably make it in the form of a lead sleeve 5. This expansible element desirably acts as a means taking part in effecting the expansion of the other expansible element 6, preferably made of iron, but I do not wish to be limited to the association of the element 5 with the element 6 for this purpose. The expansible element 6 is preferably substantially rigid and is desirably in the form of a rearwardly sloping conical sleeve through which the shank of the bolt is passed, this conical sleeve being placed to slope oppositely to the slope of the conical head or enlargement 4. The body of the expansion element 6 and the lateral extension 8 of this element form a groove extending transversely of the bolt and in which groove the second expansion element 5 is disposed. The smaller end of the element 6 is long enough, when forced inwardly by hammer blows or otherwise, or the bolt is forced outwardly with respect to element 6, to clamp upon the bolt head 4 and project radially beyond the same sufficiently to enter or substantially fill the gap intervening between the larger end of the bolt head and the mounting 1, one result being to grip the bolt head and mounting at this point to fasten this part of the bolt structure and mounting together in firm engagement. In order that the element 6 may be better adapted to this spreading action at its smaller end I desirably provide longitudinal slots 7 therein that divide the inner end of the element 6 into a plurality of wings or laterally extending formations, as illustrated most clearly in Figs. 3 and 7. The expansible element 6, when supplemented by the expansible element 5, operates to expand the element 5 when the element 6 is hammered or otherwise forced in the element 5 and the element 5, in turn, has influence in reshaping the element 6. The elements 5 and 6, the mounting, and the bolt thus coöperate to hold each other in firm engagement. When the expansible element 5 is of soft metal, such as lead, it is more effective in holding the anchoring bolt in place with the aid of the gap filling edge portion 8, for if this edge portion were absent any force that would tend to pull the anchoring bolt out would operate or tend to operate to force the soft metal of 5 to exude between the rear of the bolt enlargement 4 and the surrounding mounting element 1. A small exudation of the soft metal would loosen its bolt holding engagement with the surrounding wall of the recess. Thus, in one aspect of the invention, I have formed the bolt enlargement in two sections, the outer section 8 being adapted to ride rearwardly upon the inner section 4 and to expand as it rides to enlarge the composite bolt enlargement to fill the space adjacent the rear end of the soft metal expansible element 5 so that this soft metal expansible element cannot work rearwardly, the enlargement section 8 of hard metal acting as a guard to prevent the rearward flow of the soft metal 5 and also directly engaging the surrounding wall of the recess. The hard metal element 6 is inclusive of that part which becomes a section of the bolt enlargement and the part which is pushed upon (when the form of the invention shown in Figs. 1, 2 and 6 is employed) or which has abutting engagement with the stop or abutment 12 (when the reverse construction shown in Figs. 4 and 7 is employed), all of these parts of the element 6 being formed in a rigid structure whereby the desired result may be accomplished by transmitting upsetting pressure through the element 6 without transmitting such pressure through the soft metal. Moreover, the rigid element 6 of hard metal is adapted better to maintain the anchorage bolt in position inasmuch as there are no soft metal parts intervening between hard metal parts, though it is to be understood that I do not limit myself to these characteristics in all embodiments of the invention.

I desirably provide means whereby the bolt enlargement may not turn with respect to the expansible elements and to this end each or one of the expansible elements has interengagement with such bolt enlargement which is desirably brought about by having the conical face of the bolt enlargement formed with ridges and depressions, the ridges entering the expansible elements that themselves consequently enter the depressions. This feature of the invention is desirably realized by providing the bolt enlargement with fins 9. The expansion elements 5 and 6 are prevented from turning with respect to each other by means of the laterally extending wings at the rear end of the expansion element 6 that are forced into the soft material 5 that finds its way into the spaces between the wings.

The form of the invention shown in Figs. 4, 5 and 7 is generally similar to the other form of the invention shown, the bolt enlargement $4^1$ being, however, in the form of a nut that is threaded upon the shank of the bolt. In the second form of the invention the expansion element 6 may be spread by holding the expansion element 6 stationary and turning the bolt to force the nut $4^1$ outwardly thereby to cause this nut to enter the continuous end of the expansion element 6. Obviously the nut could be held stationary and the bolt turned to force the expansion element 6 inwardly. Thus in both forms of the invention the expansion element 6 may be held stationary and the bolt enlargement moved toward the same or the bolt enlargement may be held stationary and the expansion element moved toward the latter. In Figs. 1 and 2 I have not shown any object supported upon the bolt but in Fig. 4 the element 12 may itself be the object that is to be held in position upon the wall.

Another feature of my invention resides in providing laterally extending formation (which happens to be the flaring inner end of the hard metal sleeve in the embodiment of the invention shown) for engaging the surrounding expansion element preferably at the inner end of the latter to prevent the withdrawal of the first expansion element.

While I have herein shown and particularly described two embodiments of my invention I do not wish to be limited to the precise details of construction shown as changes may readily be made without departing from the spirit of my invention, but having thus described my invention I claim as new and desire to secure by Letters Patent the following:—

1. An anchorage device including a mounting having a recess therein; a bolt having a forwardly sloping enlargement upon its inner end that is disposed within said recess; a substantially rigid hard metal element within said recess and having its inner end surrounding and expanded by said enlargement, the inner end of said element being sloped forwardly by said enlargement and the outer end thereof sloping rearwardly; and an element of soft material surrounding the sloping portions of said element and expanded thereby into firm engagement with said mounting.

2. An anchorage device including a mounting having a recess therein; a bolt within the recess and having an enlargement upon its inner end; a hard metal element upon the bolt; and an element of soft material between the hard metal element and the wall of the recess, the element of hard metal having its outer end sloping toward the bolt rearwardly and its inner end forced laterally by said bolt enlargement, said element of soft material being between said sloping outer portion of the hard metal element and the laterally forced inner end of the hard metal element and forced by the hard metal element into engagement with the mounting.

3. An anchorage device including a mounting having a recess therein; a bolt within the recess and having an enlargement upon its inner end; a hard metal element upon the bolt; and an element of soft material between the hard metal element and the wall of the recess, the element of hard metal having its outer end sloping toward the bolt enlargement and its inner end forced laterally by said bolt enlargement, said element of soft material being between said sloping outer portion of the hard metal element and the laterally forced inner end of the hard metal element and forced by the hard metal element into engagement with the mounting, the bolt and one of the aforesaid elements having interengaging formations to prevent relative rotation thereof.

In witness whereof, I hereunto subscribe my name this twenty-sixth day of April, A. D. 1916.

RALPH S. PEIRCE.

Witnesses:
G. L. CRAGG,
E. L. WHITE.